(12) United States Patent
Grzeszczuk

(10) Patent No.: US 6,630,932 B1
(45) Date of Patent: Oct. 7, 2003

(54) METHOD AND SYSTEM FOR EFFICIENT SIMPLIFICATION OF TETRAHEDRAL MESHES USED IN 3D VOLUMETRIC REPRESENTATIONS

(75) Inventor: Robert Grzeszczuk, San Mateo, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/502,497

(22) Filed: Feb. 11, 2000

(51) Int. Cl.⁷ .............................................. G06T 17/00
(52) U.S. Cl. ..................................................... 345/420
(58) Field of Search ................................ 345/419, 420, 345/421, 423, 424

(56) References Cited

U.S. PATENT DOCUMENTS 5,812,136 A * 9/1998 Keondjian ................... 345/419

OTHER PUBLICATIONS

William Schroeder, Jonathan Zarge, William Lorensen, Decimation of Triangle Meshes, 1992, Portal—The ACM Digital Library, pp. 65–70.*

* cited by examiner

Primary Examiner—Matthew C. Bella
Assistant Examiner—G. F. Cunningham
(74) Attorney, Agent, or Firm—Woodcock Washburn LLP

(57) ABSTRACT

In a 3D graphics computer system, a method and system for efficient simplification of tetrahedral meshes used in 3D volumetric representations. The 3D computer system implements a method for manipulating a volumetric model of a 3D object to simplify the volumetric model by reducing the number of primitives within the volumetric model. To implement the method, the computer system accesses a volumetric model of a 3D object. The 3D object is modeled using a large number of volumetric primitives. After accessing, the volumetric model is analyzed to identify a plurality of sets of adjacent primitives within the model for processing. For each set of identified adjacent primitives, the set of primitives is transformed within the volumetric model to facilitate the simplification of the model. The resulting transformed set of primitives are then stored. This process is carried through to completion, until the entire volumetric model has been processed. The resulting transformed volumetric model is then output for further processing or manipulation.

28 Claims, 10 Drawing Sheets

METHOD AND SYSTEM FOR EFFICIENT SIMPLIFICATION OF TETRAHEDRAL MESHES USED IN 3D VOLUMETRIC REPRESENTATIONS

FIELD OF THE INVENTION

The field of the present invention pertains to computer implemented graphics. More particularly, the present invention pertains to a method and system for efficiently simplifying 3D tetrahedral models used in 3D volumetric representations.

BACKGROUND OF THE INVENTION

Computer graphics are being used today to perform a wide variety of tasks. Many different areas of business, industry, government, education, entertainment, and most recently, the home, are tapping into the enormous and rapidly growing list of applications developed for today's increasingly powerful computer devices. Graphical user interfaces have replaced textual interfaces as the standard means for user computer interaction.

Graphics have also become a key technology for communicating ideas, data, and trends in most areas of commerce, science, and education. Until recently, real time user interaction with three dimensional (3D) models and pseudo-realistic images was feasible on only very high performance workstations. These workstations contain dedicated, special purpose graphics hardware, and are typically very expensive. The spectacular progress of semiconductor fabrication technology has made it possible to do the same real time 3D animation, with color shaded images of complex objects, described by thousands of polygons, on rendering subsystems of only a few chips. The most recent and most powerful workstations are capable of rendering completely life-like, realistically lighted, 3D scenes.

In a 3D computer generated image, objects are typically described by data models. These models store descriptions of "primitives" (usually mathematically described polygons and polyhedra) that define the shape of the object, the object attributes, and the connectivity and positioning data describing how the objects fit together. The component polygons and polyhedra connect at common edges defined in terms of common vertices and/or enclosed volumes.

There are primarily two techniques used in 3D modeling; surface geometry modeling, and volumetric modeling. Surface geometry modeling is the more common of the two techniques. As is well known, in surface geometry modeling, primitives are used to define the surface of an object (e.g., a polygon mesh approximating the shape of the surface of an object). The polygons are textured, Z-buffered, and shaded/illustrated onto an array of pixels, creating a realistic 3D image. Volumetric modeling is the less common of the two techniques. Volumetric modeling is considerably more complex than surface geometry modeling.

The volumetric modeling, or volumetric representation of objects is typically specified in terms of a set of 3D "volumetric primitives", which include tetrahedra, blocks, cylinders, cones, spheres etc., and a set of Boolean operators, for example union, intersection and difference. In typical applications, the volumetric primitive descriptions can be much more complex, including for example, ellipsoidal shapes or other "quadric" descriptions (e.g., quadratic descriptions which consists of a second order surface with variable parameters). The volumetric modeling of complex objects is used to implement volume visualization applications.

Volume visualization is widely recognized as one of the best ways of understanding increasingly large and complex data sets, such as for example, large and complex sets of observed or simulated scientific and engineering data. The more advanced volume visualization techniques, for example, present an entire data set at once and take advantage of the innate capabilities of the human visual system to distinguish depth and recognize patterns, trends, and anomalies in complex visual environments. Such volume visualization techniques often present data with a minimum of preprocessing and enable users to interpret that data by applying their own knowledge of the scientific or engineering processes that underlie it. Hence, for example, by magnifying the human intelligence applied to the interpretation process, volume visualization allows scientists and engineers to create better solutions faster and at lower cost than ever possible before.

To achieve its best results, volume visualization requires accurate, high fidelity volume after representation of objects. Many such objects require the generation of smooth surfaces, curves, and internal and external features. To realistically generate a real-world object, various subdivision or tessellation algorithms have been developed.

The tessellation/subdivision algorithms are generally a set of geometry based rules for increasing the number of primitives used to model an object. A computer system implements these rules in the process of computing the tessellation, using the rules to manipulate the primitives of the model. A complex volumetric representation can include many hundreds of thousands of primitives.

For example, in a typical tessellation technique, the primitives comprising a volumetric model (e.g., tetrahedra) are each divided into a plurality of "daughter" to primitives. The daughter primitives share most of the characteristics of the "parent" primitive, however, their position and orientation in 3D space is influenced by the position and orientation of neighboring daughter primitives. The nature and degree of this influence is implementation specific, i.e., particular tessellation algorithms cause differing effects. Tessellation algorithms determine the placement of the vertices and edges of the daughter primitives. In so doing, a typical tessellation algorithm utilizes not only information regarding the parent primitive, but also information regarding the connectivity of the parent primitive with its neighboring primitives. The tessellation algorithm places and connects the daughter primitives in 3D space such that the primitive mesh becomes a smoother, less geometrically aliased representation of the real life object being modeled.

There exists several problems, however, with increasing the number primitives used to model volumetric 3D objects. One problem is the fact that increasing the number primitives in a model greatly increases the computational load on the computer system. In performing volumetric tessellation processing, the computer system needs to perform geometric manipulations on each of the primitives comprising the model, which can lead to severe computational loads. These computational loads often slow the graphics processing speed of the computer system. In addition to the computational loads caused by performing the tessellation itself, the computer system has a finite amount of memory space. Each primitive in the model has a number of attributes which need to be stored, e.g., the coordinates of each of the vertices of the primitive, the connective relationship of the primitive in relation to its neighbors, the orientation of the primitive in 3D space, and the like. Volumetric tessellation also reduces the number of objects a computer system can simultaneously store and manipulate, volumetric tessellation processing geometrically increases the number of primitives in a modeled object. The lack of memory resources is often a limiting factor in the graphics process. Hence, all though it is desirable to model an object with a large number of primitives in order to reduce geometric aliasing, increasing the number of primitives greatly stresses the computational resources of the computer system.

Thus, many applications require that some form of simplifying transformation be applied to a tetrahedral tessellation to facilitate easier manipulation by the computer system. For example, many adjacent cells of an "over-tessellated" object can be collapsed to decrease the cell count (e.g., two adjacent primitives can often be collapsed into one reducing the minimal cell count from 10 to 5). Similarly, certain types of sub-volumes clipped to arbitrary densely tessellated surfaces (e.g., horizon surfaces in seismic data interpretation) can result in prohibitively large number of cells and may have to be simplified in order to facilitate further manipulation. As another example, the creation of multi-resolution models of volumetrically defined objects can also require smooth transformation between various tetrahedral decompositions. Such models can be used to improve rendering performance for large volumetric models of large complex data sets, or, for example, to facilitate hierarchical collision detection. Finally, combined with multi-resolution handing of large textures, tetrahedral mesh simplification can be used as an effective model compression technique and an aid for progressive transmission.

Thus, what is required is a method and system for efficiently implementing the simplification of a complex volumetric representation. What is required is a system for efficiently simplifying a tessellated volumetric model. The system should be able to reduce the number primitives used in a volumetric representation without causing excessive geometric aliasing. The system should be able to transform a tetrahedral volumetric representation to facilitate the operation of subsequent simplification algorithms. The system of the present invention provides a novel solution to the above requirements.

SUMMARY OF THE INVENTION

The present invention provides a method and system for efficiently implementing simplification algorithms for complex volumetric representations. The system of the present invention efficiently simplifies a tessellated volumetric model. The system of the present invention is able to reduce the number primitives used in a volumetric representation without causing excessive geometric aliasing. Additionally, the system of the present invention is able to transform a tetrahedral volumetric representation to facilitate the operation of subsequent simplification algorithms.

In one embodiment, the present invention is implemented as a computer implemented method for efficient simplification of tetrahedral meshes used in 3D volumetric representations, as performed in a 3D graphics computer system. The 3D graphics computer system implements a method for manipulating a volumetric model of a 3D object to simplify the volumetric model by reducing the number of primitives within the volumetric model. To implement the method, the computer system accesses a volumetric model of a 3D object. The 3D object is modeled using a large number of volumetric primitives. After accessing, the volumetric model is analyzed to identify a plurality of sets of adjacent primitives within the model for processing. For each set of identified adjacent primitives, the set of primitives is transformed within the volumetric model to facilitate the simplification of the model. The resulting transformed set of primitives are then stored. This process is carried through to completion, until the entire volumetric model has been processed. The resulting transformed volumetric model is then output for further processing or manipulation.

In this manner, the 3D graphics computer system is able to transform a tetrahedral volumetric representation of a 3D object or scene to facilitate the operation of subsequent simplification algorithms. The specific transformation process used on the sets of adjacent primitives can be based on adaptive subdivision, geometry decimation, sampling, or similar procedures.

Embodiments of the transformation processing apply one or more specific type of local transformation (e.g., as performed on adjacent sets of primitives). Such local transformations include, for example, Face Swap, Face Split, Edge Collapse, Vertex Split, Half-Edge Collapse, Vertex Insertion, Vertex Deletion. Additionally, the transformation process may be deterministic or stochastic, algorithmic or heuristic. Further, the end result of the transformation process may or may not preserve volumetric model topology. Various refinements of the transformation process can be implemented based on various topological, geometric, or per-vertex property preserving criteria. In addition to outputting the resulting transformed volumetric model, various error metrics can also be output.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Figure 1:
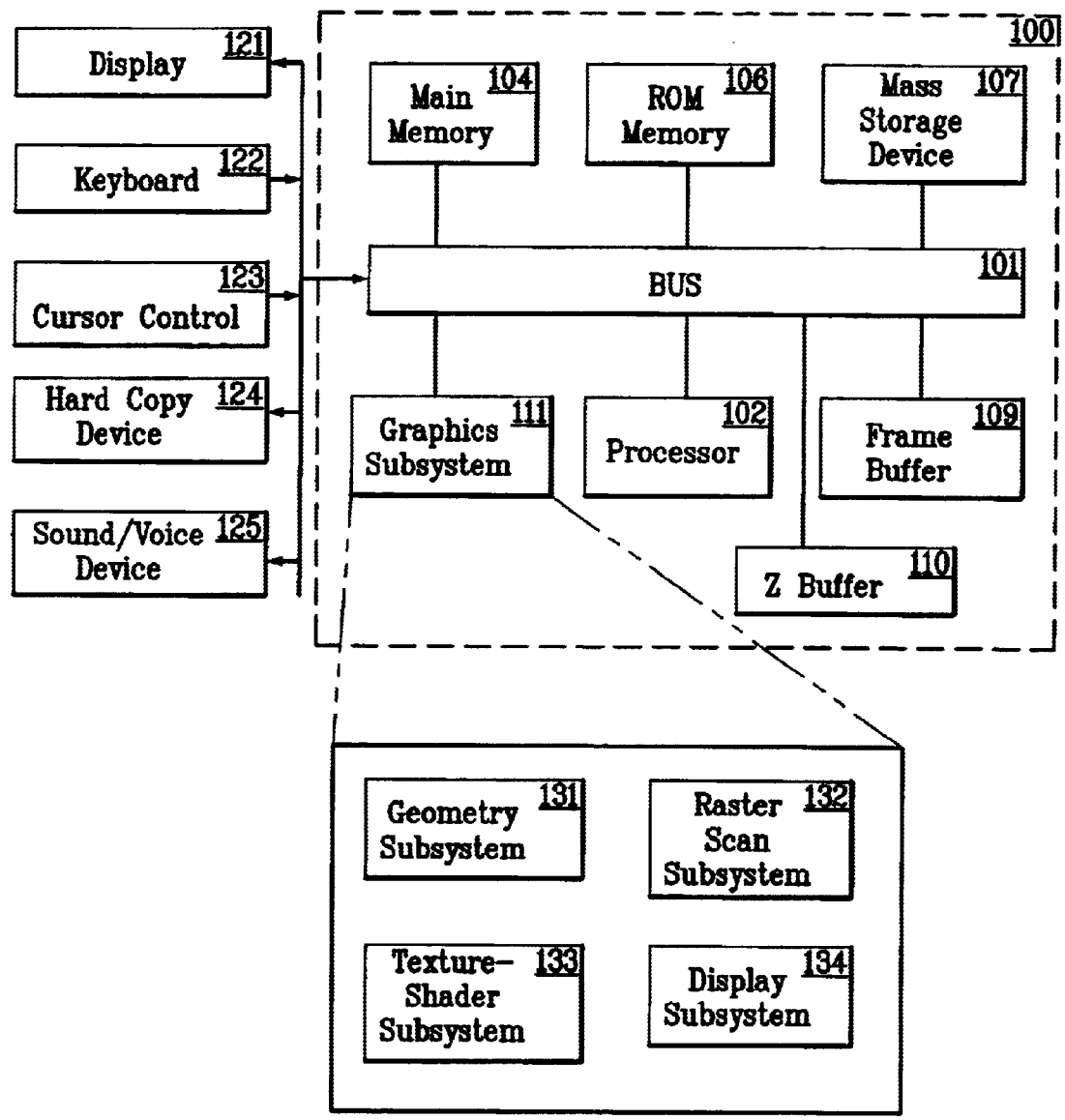
FIG. 1 shows a diagram of a 3D graphics computer system 100 in accordance with one embodiment of the present invention.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

The present invention is a method and system for efficient simplification of tetrahedral meshes used in 3D volumetric representations. The method and system of the present invention efficiently implements simplification algorithms for complex volumetric representations. The system of the present invention efficiently simplifies a tessellated volumetric model and is able to reduce the number primitives used in the model without causing excessive geometric aliasing. Additionally, the system of the present invention is able to transform a tetrahedral volumetric representation, by for example changing the aspect ratio of selected primitives in the representation, to facilitate the operation of subsequent simplification algorithms. The present invention and its benefits are described in greater detail below.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "swapping" or "processing" or "splitting" or "subdividing" or "storing" or "outputting" or "collapsing" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

Referring now to FIG. 1, a diagram of a 3D graphics computer system 100 in accordance with one embodiment of the present invention is shown. Computer system 100 depicts a basic implementation of a computer system in accordance with the present invention. Computer system 100 includes a bus 101 for transmitting digital information between the various parts of the computer system. One or more microprocessors 102 are coupled to bus 101 for processing information. The information along with the instructions of how the information is to be processed are stored in a hierarchical memory system comprised of mass storage device 107, read only memory 106, and main memory 104. Mass storage device 107 is used to store large amounts of digital data. The mass storage device 107 can consist one or more hard disk drives, floppy disk drives, optical disk drives, tape drives, CD ROM drives, or any number of other types of storage devices having media for storing data digitally. A read only memory (ROM) 106 is used to store digital data of a permanent basis, such as instructions for the micro-processors. Main memory 104 is used for storing digital data on an intermediate basis. Main memory 104 can be dynamic random access memory (DRAM).

Computer system 100 includes a 3D graphics rendering subsystem 111. Processor 102 provides the graphics subsystem 111 with graphics data, such as drawing commands, coordinate vertex data, and other data related to an object's geometric position, color, texture, shading, and other surface parameters. As with typical graphics subsystems, the object data is processed by graphics subsystem 111 in multiple stages (e.g., geometry processing, rasterization/scan conversion, etc.).

Several other optional devices may also be coupled to system 100. For example, an alphanumeric keyboard 122 is used for inputting commands and other information to processor 102. Another type of user input device is cursor control device 123 (a mouse, trackball, joystick, and the like) used for positioning a movable cursor and selecting objects on a computer screen. Another device which ay be coupled to bus 101 is a hard copy device 124 (e.g., a laser printer) for printing data or other information onto a tangible medium. Additionally, a sound recording or voice device option 125 can be coupled to the system 100 to provide multimedia capabilities.

Transformation Processing

As described above, the present invention is a method and system for efficient simplification of tetrahedral meshes used in 3D volumetric representations. Embodiments of the present invention function in part by efficiently implementing simplification algorithms for complex volumetric representations. In so doing, the complex volumetric representations are made less complex, including fewer primitives, allowing the computer system to manipulate and further process them more readily. Embodiments of the present invention function by efficiently simplifying complex volumetric models, such as, for example, a tessellated volumetric model of a real world object (e.g., a human organ imaged during a CT scan) to reduce the number primitives used in the model. The overriding goal of the simplification is to achieve this reduction without causing excessive geometric aliasing. For example, the volumetric model should be simplified (e.g., the number of comprising primitives reduced) while retaining as much information as possible. Additionally, embodiments of the present invention function in part by transforming tetrahedral volumetric representations, by for example changing the aspect ratio of selected primitives in the representation, to facilitate the operation of different types of subsequent simplification algorithms. Many of these algorithms perform in a significantly different manner where the aspect ratio and/or other characteristics of the representation are different.

Figure 2:
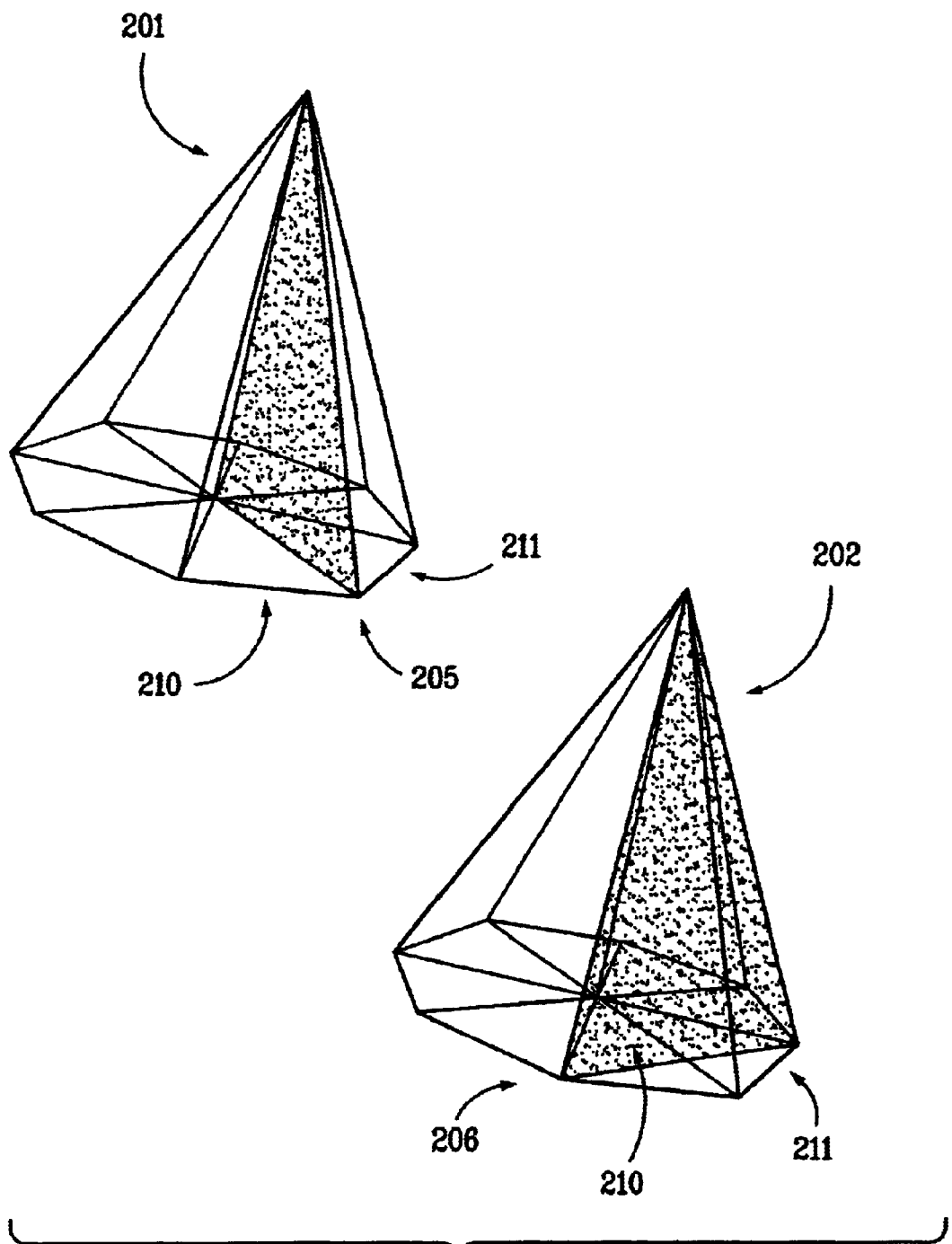
FIG. 2 shows a diagram of two sets of adjacent primitives a volumetric model in accordance with one embodiment of the present invention as used in a face swap transform.

Referring now to FIG. 2, a diagram of two sets of adjacent primitives 201 and 202 of a volumetric model in accordance with one embodiment of the present invention is shown. FIG. 2 shows the operation of a "face swap" transform process of the present embodiment. The set of adjacent primitives 201 show a configuration before a transformation process of the present embodiment is executed. The set of adjacent primitives 202 show the primitives after the transformation has been executed. Sets 201 and 202 comprise a portion of an overall volumetric representation (e.g., a volumetric model including many thousands of primitives).

The face swap transform of the present embodiment changes the orientation of tetrahedra in the set while maintaining the same number of tetrahedra. Set 201 includes 8 tetrahedra. After the face swap transformation, set 202 also includes 8 tetrahedra.

In this case, the effect of the face swap transformation is to exchange the face shared by tetrahedra 210 and 211. In set 201, tetrahedra 210 and 211 share a face 205. This face is identified and deleted. Concurrently, a new face is introduced, face 206. The effect of the deletion of face 205 and the introduction of face 206 is shown in set 202 of FIG. 2. Face swaps within sets that would cause face intersections are prevented. With the face swap transform, the number of tetrahedra comprising the overall volumetric representation remains unchanged. This transform technique is well suited for reconfiguring representations for a more uniform internal construction.

It is usually advantageous to have a more uniform internal construction of a volumetric representation due to the fact that the uniformity aids the operation of any other subsequent simplification or manipulation algorithms. For example, face swap transformations as depicted in FIG. 2 can have the effect of changing the aspect ratio of certain tetrahedra within the model. Certain optimization and/or simplification algorithms function more efficiently with tetrahedra having a more regular, more uniform aspect ratio (e.g., as where tetrahedra are more even in length as opposed to being "long and skinny").

Figure 3:
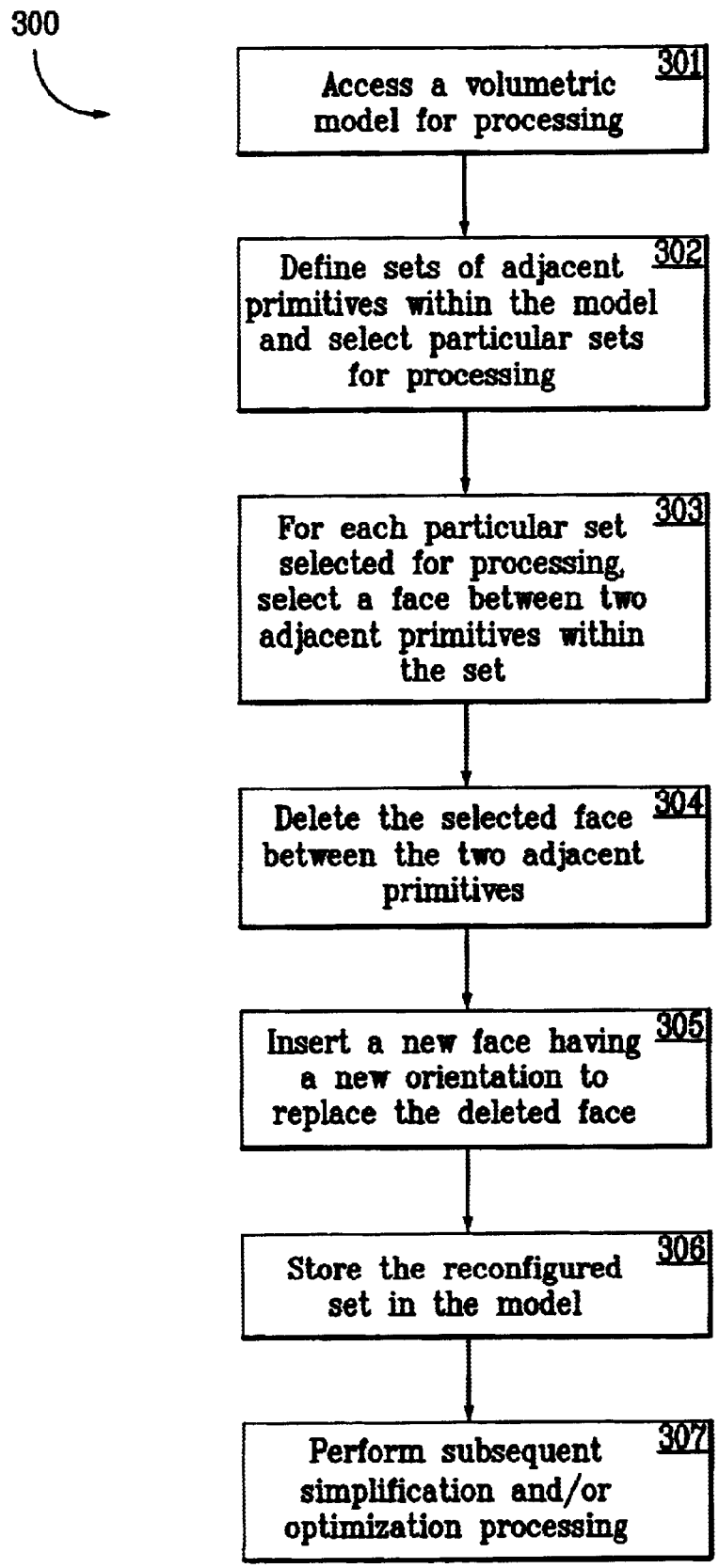
FIG. 3 shows a flow chart of the steps of a face swap transform process in accordance with one embodiment of the present invention.

FIG. 3 shows a flow chart of the steps of a face swap transform process 300 in accordance with one embodiment of the present invention. The steps of process 300 depict the face swap local transformation process as performed on set 201 of FIG. 2.

Process 300 (e.g., the face swap transformation) begins in step 301, where the volumetric model (e.g., a volumetric representation) is accessed by computer system 100 for processing. In step 302, sets of adjacent primitives within the model are defined. Then particular sets are selected for face swap transformation processing. In step 303, for each particular set selected for processing, a face between two adjacent primitives (e.g., tetrahedra) within the set is selected. In step 304, the selected face between the two adjacent primitives is deleted. Then, in step 305, a new face having a new orientation is inserted to replace the deleted face. As described above, the insertion of the new face has the effect of changing the aspect ratio of the two adjacent primitives. In step 306, the reconfigured set is stored in the model, thereby updating the model. And in step 307, after all the particular sets selected for processing have been transformed, the updated model is ready for subsequent simplification and/or optimization processing.

Figure 4:
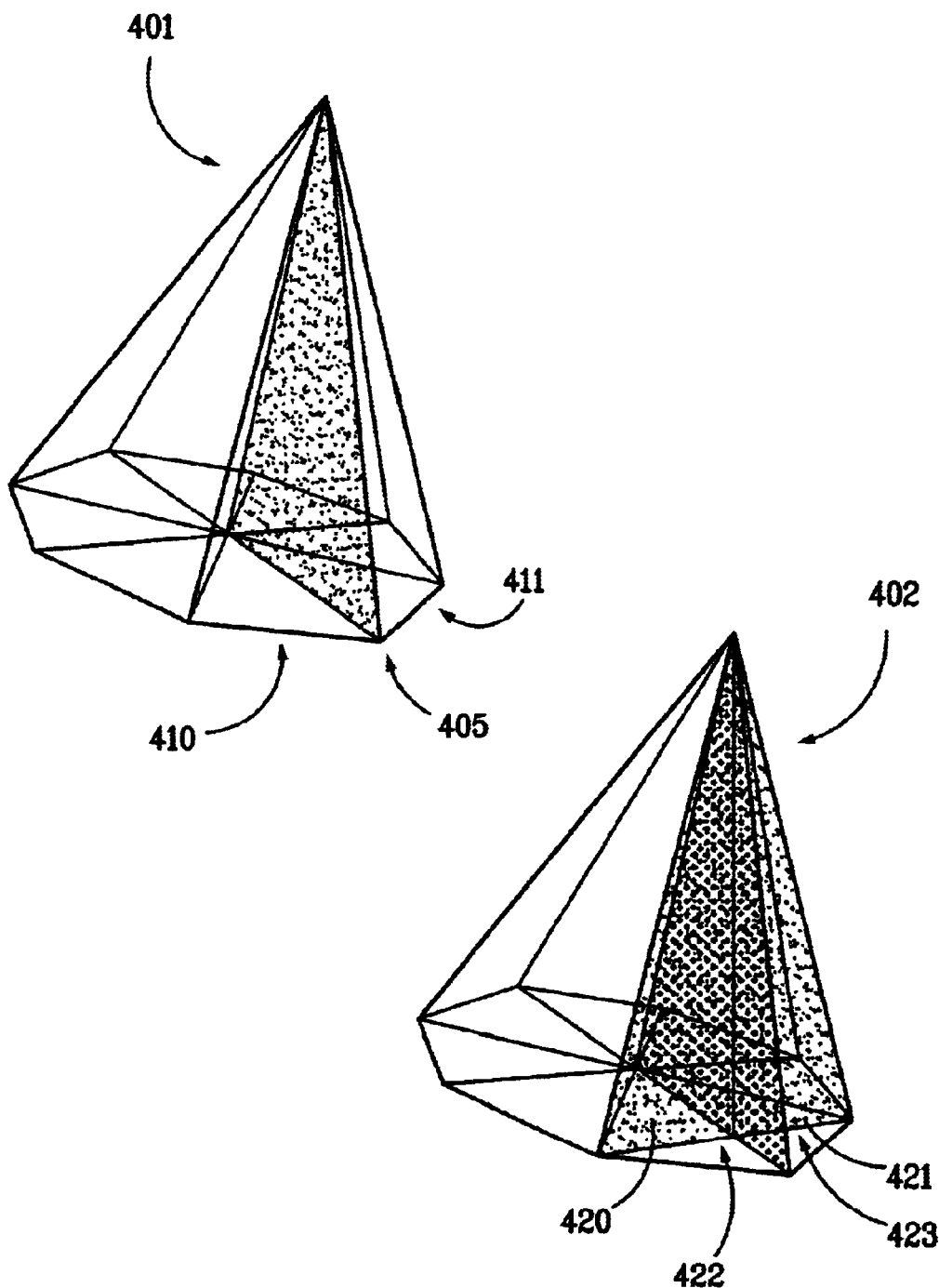
FIG. 4 shows a diagram of two sets of adjacent primitives of a volumetric model in accordance with another embodiment of the present invention as used in a face split transform.

Referring now to FIG. 4, a diagram of two sets of adjacent primitives 401 and 402 of a volumetric model in accordance with another embodiment of the present invention is shown. FIG. 4 shows the operation of a "face split" transform process of the present embodiment. The set of adjacent primitives 401 show a configuration before the face split transformation process of the present embodiment is executed. The set of adjacent primitives 402 show the primitives after the transformation has been executed. As with sets 201 and 202 of FIG. 2, sets 401 and 402 comprise a portion of an overall volumetric representation.

The face split transform of the present embodiment increases the number of cells (e.g., tetrahedra) in each set of adjacent primitives by 2. Set 401 includes 8 tetrahedra. After the face split transformation, set 402 includes 10 tetrahedra. The face split transformation of the present embodiment functions by identifying an internal face between two tetrahedra, in this case tetrahedra 410 and 411 and inserting a new diagonal face to yield four tetrahedra 420–423. The original two tetras are split into four, increasing the number of cells by two.

A goal of the face split transformation process of the present embodiment is to reconfigure the internal construction of a volumetric representation for a more uniform internal construction. Hence, as with the face swap embodiment described in the discussion of FIG. 2, the face split embodiment of FIG. 4 can produce a more advantageous uniform internal construction of a volumetric representation due to the fact that the uniformity aids the operation of any other subsequent simplification or manipulation algorithms. However, the face split transformation of the present embodiment actually increases the number of tetrahedra in the representation as opposed to keeping a same number of tetrahedra as with the face split transformation embodiment.

The face split transformation of the present embodiment depicted in FIG. 4 has the effect of changing the aspect ratio of the tetrahedra within the model. As described above, certain optimization and/or simplification algorithms function more efficiently with tetrahedra having a more regular, more uniform aspect ratio. Hence, even though the number of tetrahedra increases with set 402, set 402 can be more easily simplified since the tetrahedra are of a more desirable aspect ratio.

Figure 5:
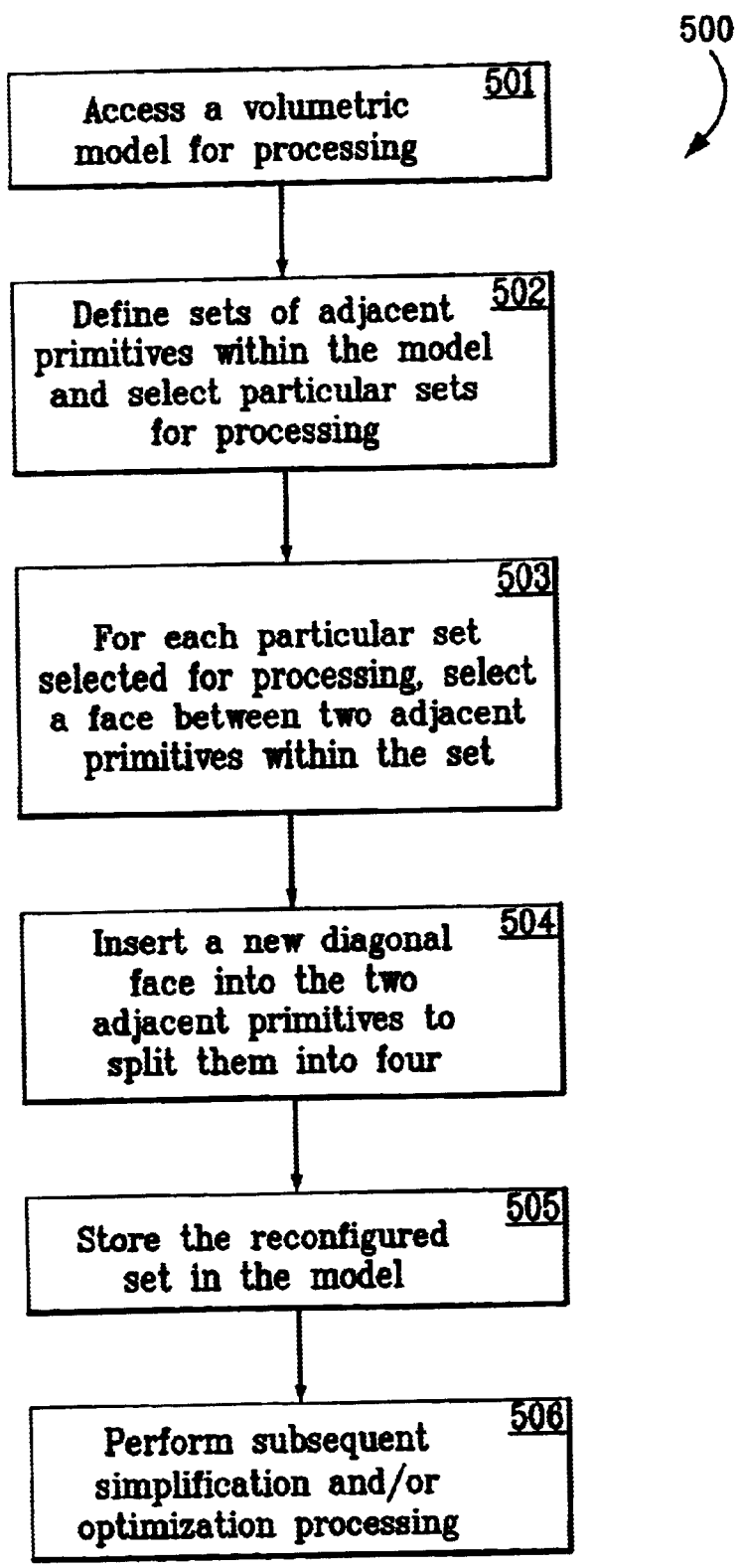
FIG. 5 shows a flow chart of the steps of a face split transform process in accordance with one embodiment of the present invention.

FIG. 5 shows a flow chart of the steps of a face split transform process 500 in accordance with one embodiment of the present invention. The steps of process 500 depict the face split local transformation process as performed on set 401 of FIG. 4.

Process 500 (e.g., the face split transformation) begins in step 501, where the volumetric model (e.g., a volumetric representation) is accessed by computer system 100 for processing. In step 502, sets of adjacent primitives within the model are defined. Then particular sets are selected for face split transformation processing. In step 503, for each particular set selected for processing, a face between two adjacent primitives (e.g., tetrahedra) within the set is selected. In step 504, a new diagonal face, having a diagonal orientation with respect to the selected face from step 503, is inserted. As described above, the insertion of the new diagonal face has the effect of splitting the two adjacent primitives into four, each having a different aspect ratio than the original two adjacent primitives. In step 505, the reconfigured set is stored in the model, thereby updating the model. And in step 506, after all the particular sets selected for processing have been transformed, the updated model is ready for subsequent simplification and/or optimization processing.

Figure 6:
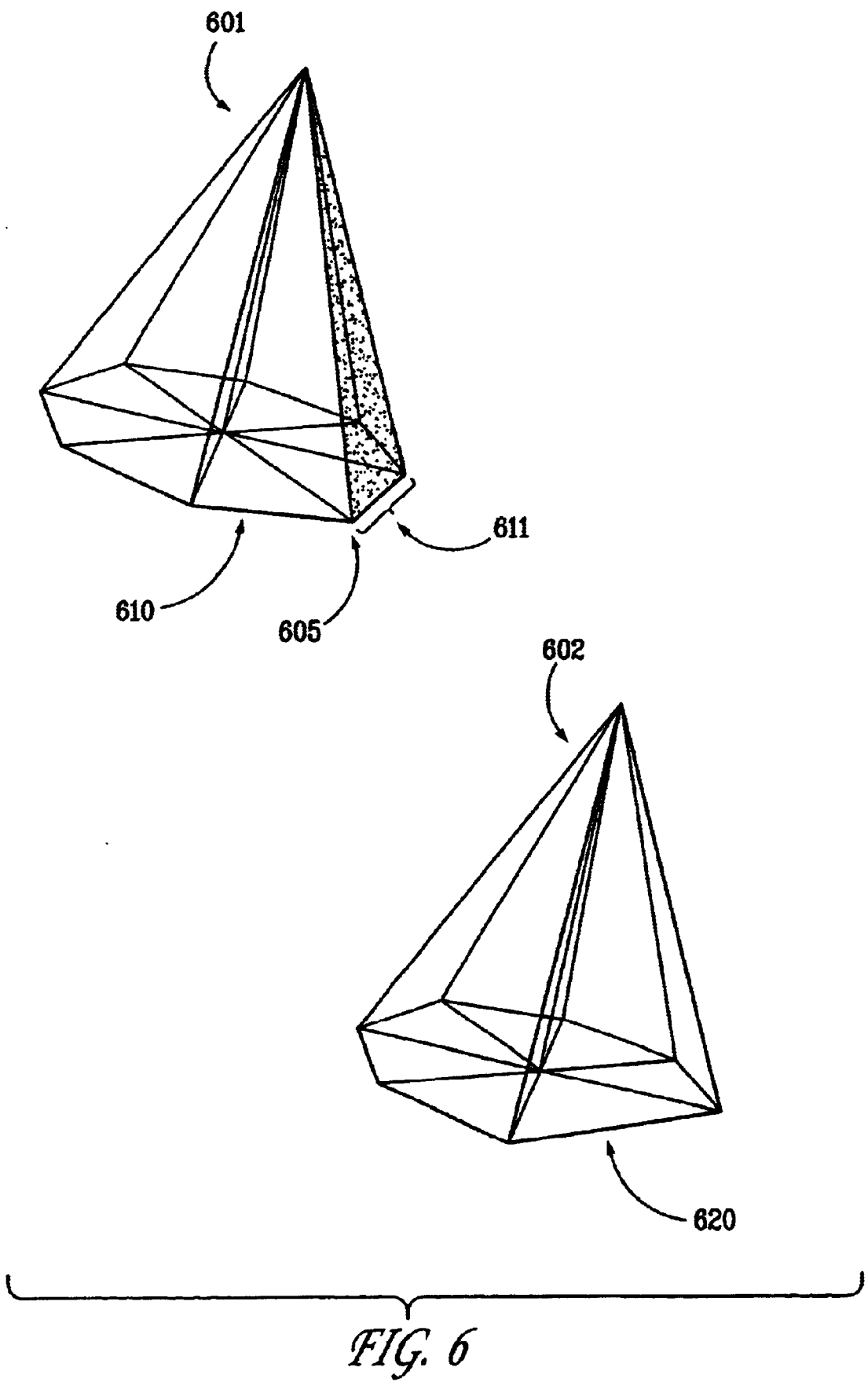
FIG. 6 shows a diagram of two sets of adjacent primitives of a volumetric model in accordance with another embodiment of the present invention as used in an edge collapse transform.

Referring now to FIG. 6, a diagram of two sets of adjacent primitives 601 and 602 of a volumetric model in accordance with another embodiment of the present invention is shown. FIG. 6 shows the operation of an "edge collapse" transform process of the present embodiment. The set of adjacent primitives 601 show a configuration before the edge collapse transformation process of the present embodiment is executed. The set of adjacent primitives 602 show the primitives after the transformation has been executed. As with sets 201 and 202 of FIG. 2, sets 601 and 602 comprise a portion of an overall volumetric representation.

The edge collapse transform of the present embodiment decreases the number of cells (e.g., tetrahedra) in each set of adjacent primitives by one or more. Set 601 includes 8 tetrahedra. After the edge collapse transformation, set 602 includes 7 tetrahedra. The edge collapse transformation of the present embodiment functions by identifying an internal face 605 between two tetrahedra, in this case tetrahedra 610 and 611 and deleting that face, thereby collapsing the two tetrahedra 610 and 611 into a single tetrahedral 620. The edge collapse transform is implemented in part by selecting an edge of a tetrahedral (e.g., tetrahedral 610) of the set 201 and equating one of the vertices of the edge with the other, collapsing the edge as the result. The original two tetrahedra 610 and 611 are collapsed into one tetrahedral 620.

As with the face swap and the face split transformations, a goal of the edge collapse transformation process of the present embodiment is to reconfigure the internal construction of a volumetric representation to aid the performance of subsequent simplification/optimization algorithms. However, as opposed to the face swap embodiment described in the discussion of FIG. 2 and the face split embodiment of FIG. 4, the edge collapse transform of the present embodiment can produce a simpler internal construction of a volumetric representation due to the fact that the operation of the edge collapse transform results in a representation having fewer primitives. Thus, even though the subsequent operation of certain optimization and/or simplification algorithms function more efficiently, the execution of the edge collapse transform itself results in more simple representation having fewer primitives.

It should be noted that a variation of the edge collapse transform is the "vertex split" transform. The vertex split transform is an inverse operation of the edge collapse transform, where a single vertex is expanded into an edge forming additional cells. The vertex split variation can be used in those cases where a more favorable internal configuration of the volumetric representation would result.

Figure 7:
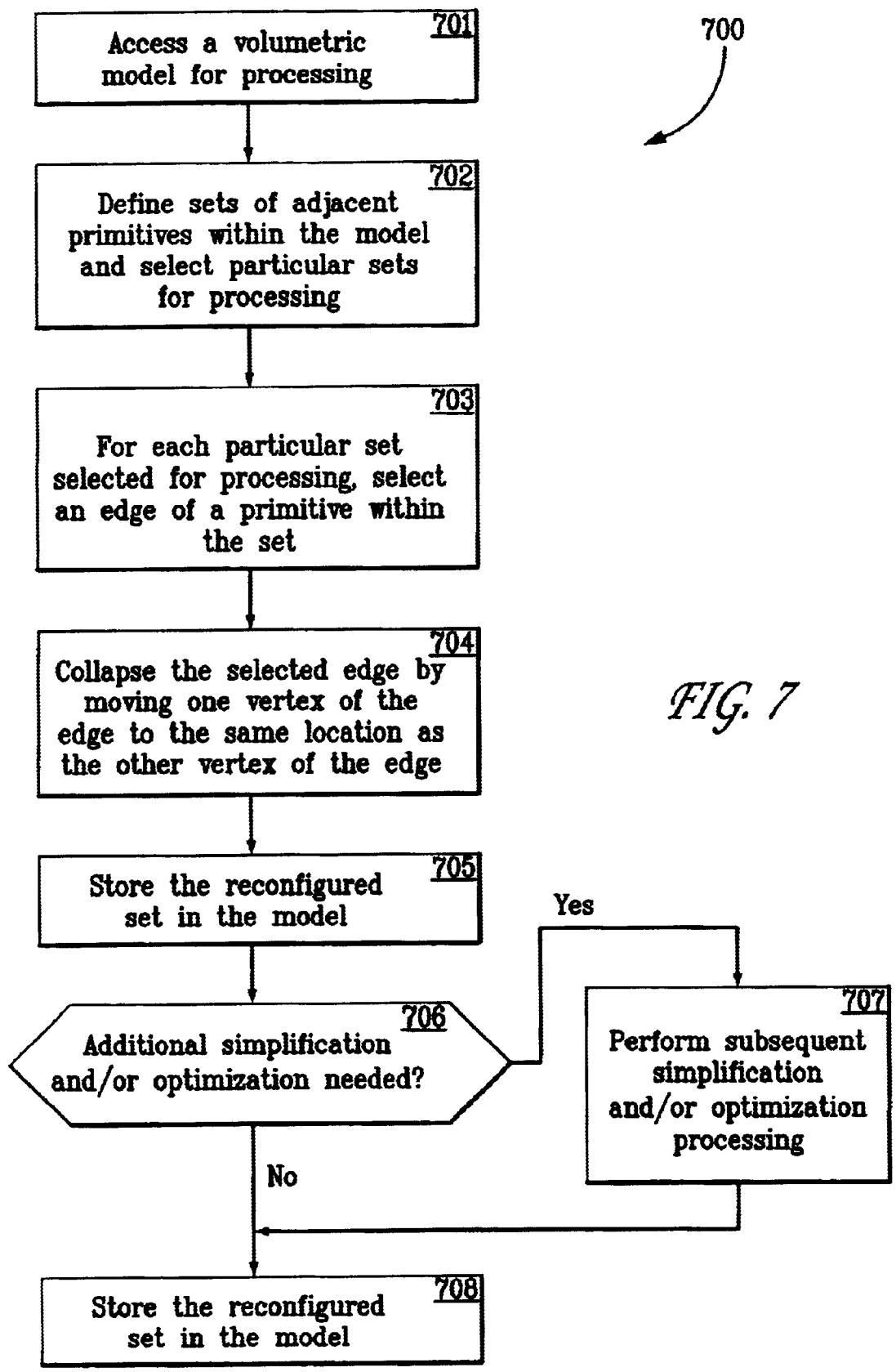
FIG. 7 shows a flow chart of the steps of an edge collapse transform process in accordance with one embodiment of the present invention.

FIG. 7 shows a flow chart of the steps of an edge collapse transform process 700 in accordance with one embodiment of the present invention. The steps of process 700 depict the edge collapse local transformation process as performed on set 601 of FIG. 6.

Process 700 (e.g., the edge collapse transformation) begins in step 701, where the volumetric model (e.g., a volumetric representation) is accessed by computer system 100 for processing. In step 702, sets of adjacent primitives within the model are defined. Then particular sets are selected for edge collapse transformation processing. In step 703, for each particular set selected for processing, an edge of one primitive (e.g., tetrahedral) within the set is selected. In step 704, the selected edge of the primitive is collapsed by moving one vertex of the edge to the same location as the other vertex of the edge (e.g., identifying one vertex to be the other). As described above, the collapsing of the edge of the primitive has the effect of collapsing two adjacent primitives into one, thereby reducing the number of primitives in the set by one. In step 705, the reconfigured set is stored in the model, thereby updating the model. And in step 706, after all the particular sets selected for processing have been transformed, a determination is made as to whether the updated model requires additional simplification and/or optimization processing. If additional simplification and/or optimization is required, process 700 proceeds to step 707 and then step 708, else, process 700 proceeds directly to step 708 as shown. As described above, the edge collapse transformation results in a more simple model having fewer primitives. However, additional simplification and/or optimization processing can still be performed, for example, as dictated by the particular requirements of the user.

Figure 8:
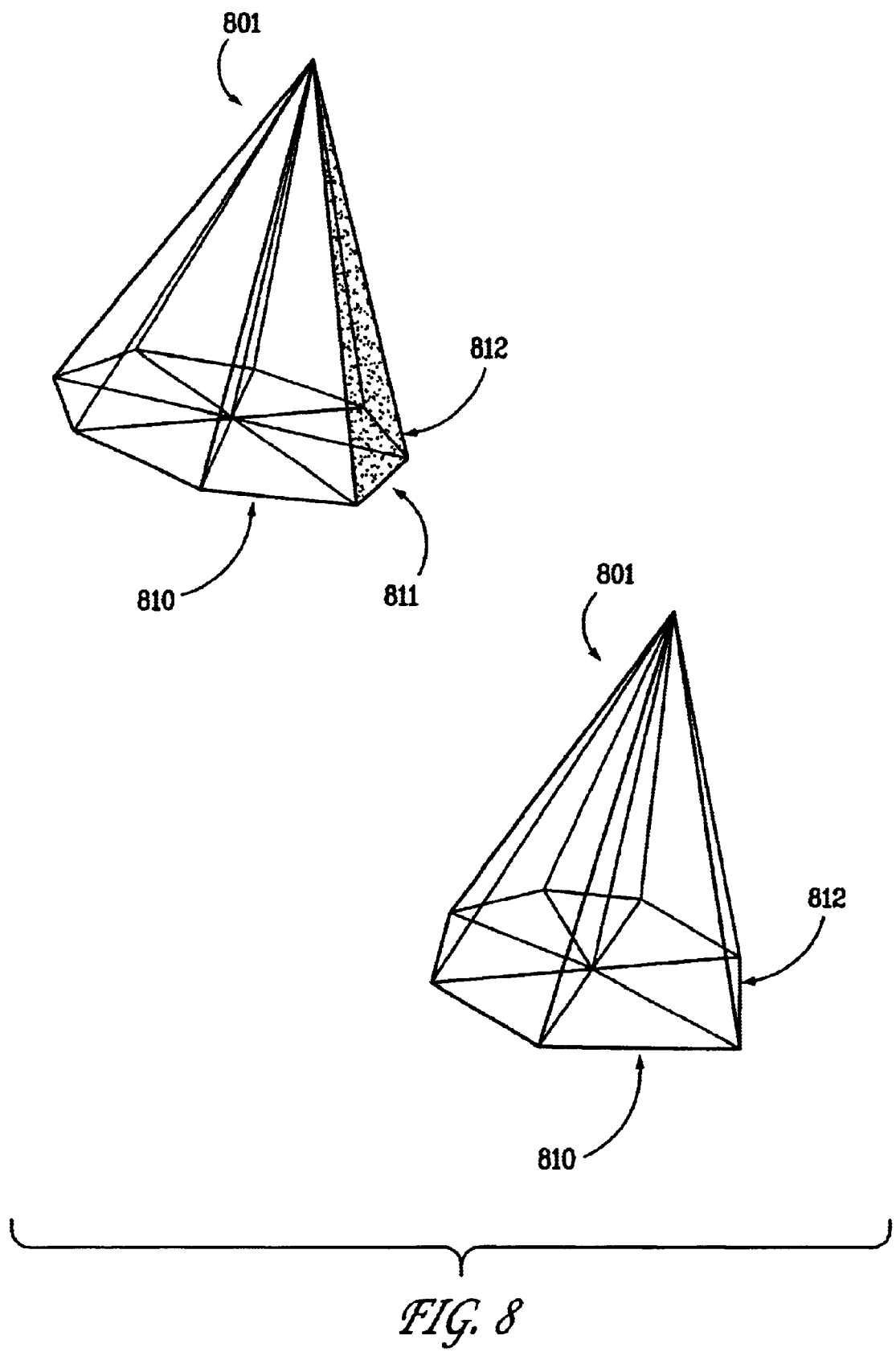
FIG. 8 a diagram of two sets of adjacent primitives of a volumetric model in accordance with another embodiment of the present invention as used in a half edge collapse transform.

Referring now to FIG. 8, a diagram of two sets of adjacent primitives 801 and 802 of a volumetric model in accordance with another embodiment of the present invention is shown. FIG. 8 shows the operation of a "half edge collapse" transform process of the present embodiment. The set of adjacent primitives 801 show a configuration before the half edge collapse transformation process of the present embodiment is executed. The set of adjacent primitives 802 show the primitives after the transformation has been executed. As with sets 201 and 202 of FIG. 2, sets 801 and 802 comprise a portion of an overall volumetric representation.

The half edge collapse transformation is analogous to the edge collapse transformation. The half edge collapse transformation of the present embodiment differs, however, in that instead moving one vertex of a selected edge onto the other, both vertices of the selected edge are moved towards a center (or some other point) of the edge. Hence, the result of the half edge collapse transform is the collapsing of three tetrahedra 810, 811, and 812 into two tetrahedra 810 and 812 (e.g., thereby eliminating tetrahedral 811). Half edge collapse transforms are well suited for creating smoothly varying representations since the distortion of the sets of adjacent primitives tends to be less pronounced.

As with the other embodiments (e.g., face swap, face split, etc.), a goal of the half edge collapse transformation process of the present embodiment is reconfiguration of volumetric representations for better performance of subsequent simplification/optimization algorithms. However, as with the edge collapse embodiment described in the discussion of FIG. 6, the half edge collapse transform of the present embodiment can produce a simpler internal construction of a volumetric representation due to the fact that a representation having fewer primitives results. Thus, even though the subsequent operation of certain optimization and/or simplification algorithms function more efficiently, the execution of the half edge collapse transform itself results in more simple representation having fewer primitives.

Figure 9:
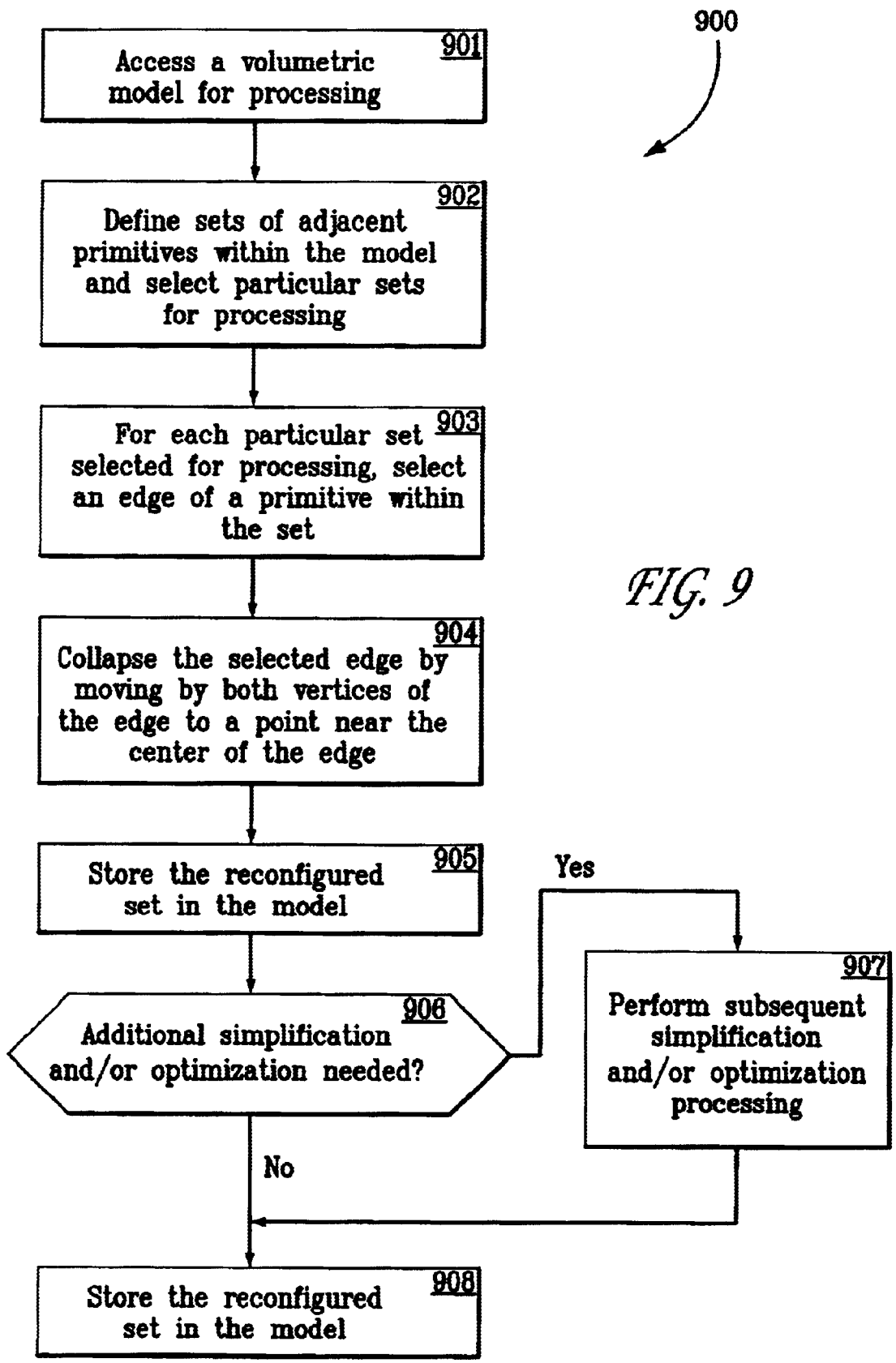
FIG. 9 shows a flow chart of the steps of a half edge collapse transform process in accordance with one embodiment of the present invention.

FIG. 9 shows a flow chart of the steps of a half edge collapse transform process 900 in accordance with one embodiment of the present invention. The steps of process 900 depict the half edge collapse local transformation process as performed on set 801 of FIG. 8.

Process 900 (e.g., the half edge collapse transformation) begins in step 901, where the volumetric model (e.g., a volumetric representation) is accessed by computer system 100 for processing. In step 902, sets of adjacent primitives within the model are defined. Then particular sets are selected for half edge collapse transformation processing. In step 903, for each particular set selected for processing, an edge of one primitive (e.g., tetrahedral) within the set is selected. In step 904, the selected edge of the primitive is collapsed by moving both vertices of the edge to a point near the center of the edge. As described above, the half edge collapsing the primitive has the effect of collapsing three adjacent primitives into two, reducing the number of primitives in the set by one. In step 905, the reconfigured set is stored in the model, thereby updating the model. And in step 906, after all the particular sets selected for processing have been transformed, a determination is made as to whether the updated model requires additional simplification and/or optimization processing. If additional simplification and/or optimization is required, process 900 proceeds to step 907 and then step 908, else, process 900 proceeds directly to step 908 as shown. As with the edge collapse transformation, the half edge collapse transformation results in a more simple model having fewer primitives. However, additional simplification and/or optimization processing can still be performed.

Figure 10:
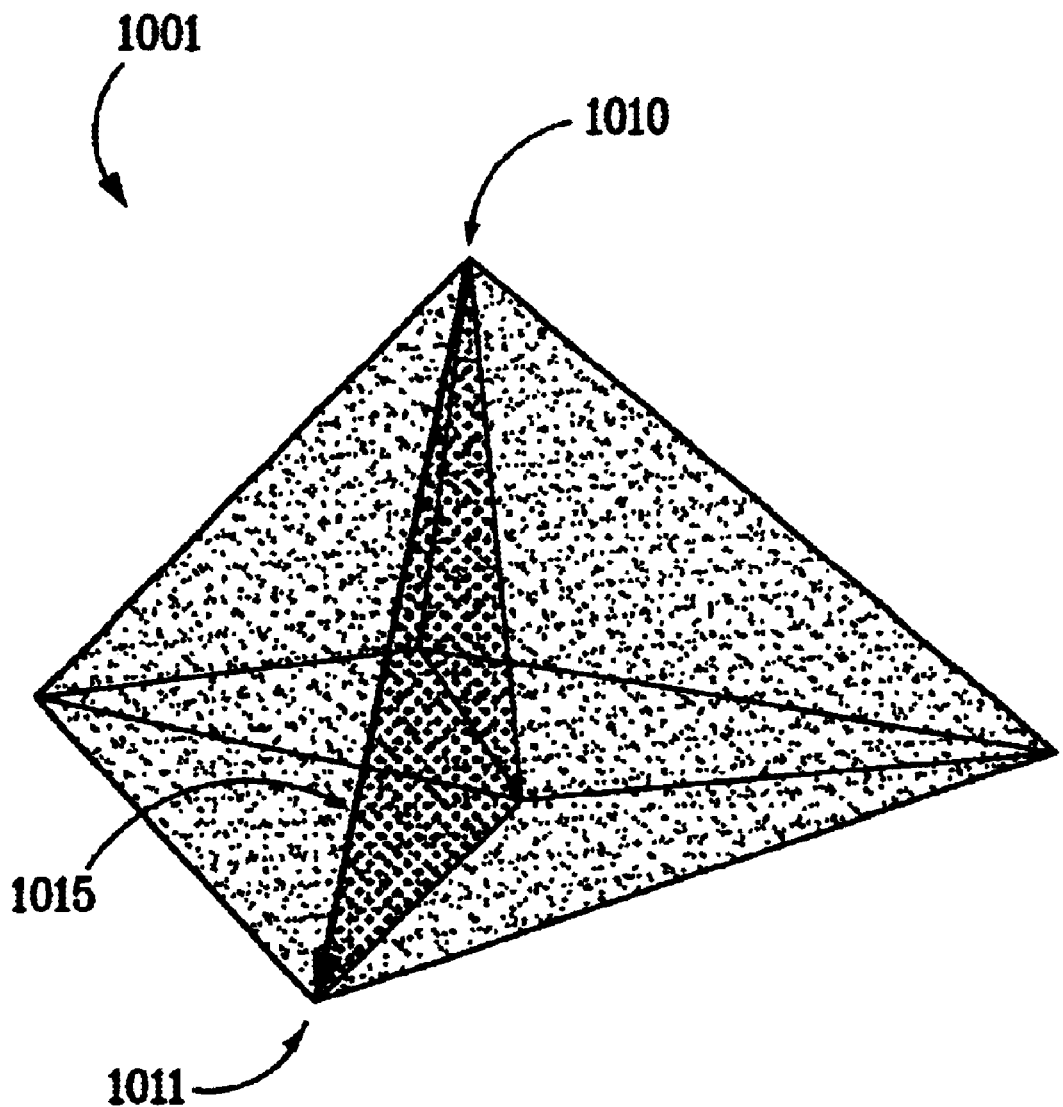
FIG. 10 shows a diagram of a set of adjacent primitives of a volumetric model wherein the operation of an edge collapse transform in accordance with one embodiment can result in the collapse of all the primitives of the set.

Referring now to FIG. 10, a diagram of a set of adjacent primitives 1001 of a volumetric model is shown. FIG. 10 shows a case where the operation of an edge collapse transform in accordance with one embodiment can result in the collapse of all the primitives of set 1001. FIG. 10 depicts a vertex 1010 that is shared by all tetrahedra within set 1001. Where an edge collapse transformation is performed, by moving the location of vertex 1010 to the location of vertex 1011 (as shown by arrow 1015), edge between vertices 1010 and 1011 collapses, resulting in the collapse of all tetrahedra in the set 1001.

Thus, as depicted in FIG. 10, it should be noted that in certain situations several tetrahedra can be eliminated by a single edge collapse transform. This is unlike a polygonal edge collapse (e.g., as in surface geometry representations), where in the case of well formed manifold polygon meshes, such operations tend to remove at most two polygons. This is due to the fact that, in volumetric representations, the edge being collapsed can be a member of several tetrahedral faces, each of which gets collapsed, causing collapse of additional tetrahedra. For example, FIG. 10 shows collapsing an edge between vertices 1010 and 1011. This results in the collapse of four cells, because the vertex involved in the edge being collapsed was shared by each of them. Therefore, a single edge collapse operation can have fairly drastic consequences. For example, collapsing an axial edge a "cone" of tetrahedral primitives can cause all the tetrahedra in the cone to collapse. Accordingly, the operation of the edge collapse and half edge collapse transformations of the present invention should be configured to take this characteristic into account.

Thus, the method and system of the present invention efficiently implements simplification algorithms for complex volumetric representations. The system of the present invention efficiently simplifies a tessellated volumetric model and is able to reduce the number primitives used in the model without causing excessive geometric aliasing. Additionally, the system of the present invention is able to transform a tetrahedral volumetric representation, by for example changing the aspect ratio of selected primitives in the representation, to facilitate the operation of subsequent simplification algorithms.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a 3D graphics computer system, a method for manipulating volumetric model of a 3D object to simplify the volumetric model, the method comprising the computer system performing the steps of:
    a) accessing a volumetric model of a 3D object;
    b) analyzing the volumetric model to identify a plurality of sets of adjacent primitives within the model for processing, wherein the primitives;
    c) transforming the set of primitives within the model to facilitate simplification of the model,
        wherein the transforming is performed for each set of adjacent primitives identified in step b),
        wherein the transforming step comprises the step of performing a transform comprising any of a face swap transform, face split transform, and edge collapse transform, and a half edge collapse transform;
    d) storing the transformed primitives resulting from step c); and
    e) outputting a transformed volumetric model resulting from step c).

2. The method of claim 1 wherein the primitives are tetrahedral type primitives.

3. The method of claim 1 wherein the transforming performed in step c) includes the step of performing a face swap transform by:
    deleting a selected face between two adjacent primitives of the set of adjacent primitives; and
    inserting a new face between the two adjacent primitives to replace the deleted face, wherein the new face has a different orientation with respect to the deleted face.

4. The method of claim 1 wherein the transforming performed in step c) includes the step of performing a face split transform by:
    selecting a face between two adjacent primitives of the set of primitives; and
    inserting a new face into the two adjacent primitives to split the two adjacent primitives into four adjacent primitives.

5. The method of claim 1 wherein the transforming performed in step c) includes the step of performing an edge collapse transform by:
    selecting an edge of a primitive of the set of adjacent primitives, the edge having two vertices; and
    collapsing the selected edge by moving one vertex of the edge to the other vertex of the edge.

6. The method of claim 1 wherein the transforming performed in step c) includes the step of performing a half edge collapse transform by:
    selecting an edge of a primitive of the set of adjacent primitives, the edge having two vertices; and
    collapsing the selected edge by moving both vertices to a point near the center of the edge.

7. The method of claim 1 further including the step of performing subsequent simplification processing on the transformed volumetric model using a deterministic simplification algorithm.

8. The method of claim 1 further including the step of performing subsequent simplification processing on the transformed volumetric model using a stochastic simplification algorithm.

9. The method of claim 1 further including the step of performing subsequent simplification processing on the transformed volumetric model using a heuristic simplification algorithm.

10. The method of claim 1 wherein the volumetric model accessed in step a) is a tessellated volumetric model.

11. A method for simplifying a volumetric model of a 3D object, the volumetric model simplified by reducing the number of tetrahedra within the volumetric model, the method implemented in a 3D graphics computer system having a processor coupled to a computer readable memory, the memory containing computer readable instructions which when executed cause the computer system to perform the steps of:

a) accessing a volumetric model of a 3D object;

b) analyzing the volumetric model to identify a plurality of sets of adjacent tetrahedra within the model for processing;

c) transforming the set of tetrahedra within the model to facilitate simplification of the model, wherein the transforming is performed for each set of adjacent tetrahedra identified in step b);

d) storing the transformed tetrahedra resulting from step c); and e) outputting a transformed volumetric model resulting from step c).

12. The method of claim 11 wherein the transforming performed in step c) includes the step of performing a face swap transform by:

deleting a selected face between two adjacent tetrahedra of the set of adjacent tetrahedra; and inserting a new face between the two adjacent tetrahedra to replace the deleted face, wherein the new face has a different orientation with respect to the deleted face.

13. The method of claim 11 wherein the transforming performed in step c) includes the step of performing a face split transform by:

selecting a face between two adjacent tetrahedra of the set of tetrahedra; and inserting a new face into the two adjacent tetrahedra to split the two adjacent tetrahedra into four adjacent tetrahedra.

14. The method of claim 11 wherein the transforming performed in step c) includes the step of performing an edge collapse transform by:

selecting an edge of a tetrahedral of the set of adjacent tetrahedra, the edge having two vertices; and collapsing the selected edge by moving one vertex of the edge to the other vertex of the edge.

15. The method of claim 11 wherein the transforming performed in step c) includes the step of performing a half edge collapse transform by:

selecting an edge of a tetrahedral of the set of adjacent tetrahedra, the edge having two vertices; and collapsing the selected edge by moving both vertices to a point near the center of the edge.

16. The method of claim 11 further including the step of performing subsequent simplification processing on the transformed volumetric model using a deterministic simplification algorithm.

17. The method of claim 11 further including the step of performing subsequent simplification processing on the transformed volumetric model using a stochastic simplification algorithm.

18. The method of claim 11 further including the step of performing subsequent simplification processing on the transformed volumetric model using a heuristic simplification algorithm.

19. The method of claim 11 wherein the volumetric model accessed in step a) is a tessellated volumetric model.

20. A 3D graphics computer system having a processor coupled to a computer readable memory, the memory containing computer readable instructions which when executed implement a method for simplifying a volumetric model of a 3D object, the volumetric model simplified by reducing the number of tetrahedra within the volumetric model, the method comprising the computer system performing the steps of:

a) accessing a volumetric model of a 3D object;

b) analyzing the volumetric model to identify a plurality of sets of adjacent tetrahedra within the model for processing;

c) transforming the set of tetrahedra within the model to facilitate simplification of the model, wherein the transforming is performed for each set of adjacent tetrahedra identified in step b);

d) storing the transformed tetrahedra resulting from step c); and e) outputting a transformed volumetric model resulting from step c).

21. The system of claim 20 wherein the transforming performed in step c) includes the step of performing a face swap transform by:

deleting a selected face between two adjacent tetrahedra of the set of adjacent tetrahedra; and inserting a new face between the two adjacent tetrahedra to replace the deleted face, wherein the new face has a different orientation with respect to the deleted face.

22. The system of claim 20 wherein the transforming performed in step c) includes the step of performing a face split transform by:

selecting a face between two adjacent tetrahedra of the set of tetrahedra; and inserting a new face into the two adjacent tetrahedra to split the two adjacent tetrahedra into four adjacent tetrahedra.

23. The system of claim 20 wherein the transforming performed in step c) includes the step of performing an edge collapse transform by:

selecting an edge of a tetrahedral of the set of adjacent tetrahedra, the edge having two vertices; and collapsing the selected edge by moving one vertex of the edge to the other vertex of the edge.

24. The system of claim 20 wherein the transforming performed in step c) includes the step of performing a half edge collapse transform by:

selecting an edge of a tetrahedral of the set of adjacent tetrahedra, the edge having two vertices; and collapsing the selected edge by moving both vertices to a point near the center of the edge.

25. The system of claim 20 further including the step of performing subsequent simplification processing on the transformed volumetric model using a deterministic simplification algorithm.

26. The system of claim 20 further including the step of performing subsequent simplification processing on the transformed volumetric model using a stochastic simplification algorithm.

27. The system of claim 20 further including the step of performing subsequent simplification processing on the transformed volumetric model using a heuristic simplification algorithm.

28. The system of claim 20 wherein the volumetric model accessed in step a) is a tessellated volumetric model.

* * * * *